(12) United States Patent
Kaidu et al.

(10) Patent No.: US 11,005,398 B2
(45) Date of Patent: May 11, 2021

(54) MOTOR DRIVE CONTROLLER AND MOTOR DRIVE CONTROL METHOD

(71) Applicant: Minebea Mitsumi Inc., Nagano (JP)

(72) Inventors: Hiroyuki Kaidu, Iwata (JP); Youhei Serizawa, Kakegawa (JP); Shunsuke Harigae, Sakura (JP); Zhou Xiao, Fukuroi (JP)

(73) Assignee: MINEBEA MITSUMI INC., Nagano (JP)

( * ) Notice: Subject to any disclaimer, the term of this patent is extended or adjusted under 35 U.S.C. 154(b) by 38 days.

(21) Appl. No.: 15/983,274

(22) Filed: May 18, 2018

(65) Prior Publication Data

US 2018/0342965 A1    Nov. 29, 2018

(30) Foreign Application Priority Data

May 24, 2017    (JP) .............................. JP2017-102496

(51) Int. Cl.
*H02P 6/21*    (2016.01)
*H02P 1/02*    (2006.01)
*H02P 6/24*    (2006.01)

(52) U.S. Cl.
CPC .............. *H02P 6/21* (2016.02); *H02P 1/026* (2013.01); *H02P 6/24* (2013.01)

(58) Field of Classification Search
CPC ................. H02P 8/12; H02P 1/00; H02P 3/00
See application file for complete search history.

(56) References Cited

U.S. PATENT DOCUMENTS

| 6,806,675 | B2 * | 10/2004 | Wang | H02P 8/12 |
|   |   |   |   | 318/432 |
| 9,397,597 | B2 * | 7/2016 | Qu | H02P 8/12 |
| 2009/0263260 | A1 * | 10/2009 | Goto | H02M 3/3376 |
|   |   |   |   | 417/410.1 |

(Continued)

FOREIGN PATENT DOCUMENTS

| JP | 2006-238571 A | 9/2006 |
| JP | 2013-013223 A | 1/2013 |
| JP | 2016-082780 A | 5/2016 |

OTHER PUBLICATIONS

Japanese Office Action dated Oct. 15, 2019 for corresponding Japanese Application No. 2017-102496 and English translation.

*Primary Examiner* — Said Bouziane
(74) *Attorney, Agent, or Firm* — Pearne & Gordon LLP

(57) ABSTRACT

Provided is a motor drive controller capable of a locking energization operation while preventing increase in temperature of a coil. The motor drive controller includes a motor drive section selectively energizing coils with a plurality of phases of a motor and a locking energization control section. The locking energization control section performs a locking energization operation when the motor is started or restarted and holds a rotor of the motor in a position corresponding to the coil in which the lock current flows. In case of performing the locking energization operation, the locking energization control section switches a locking energization pattern for applying the lock current in the coil from a locking energization pattern when the preceding locking energization operation was performed. The locking energization control section controls the motor drive section so that the lock current flows in the coil in accordance with the switched locking energization pattern.

13 Claims, 12 Drawing Sheets

(56) References Cited

U.S. PATENT DOCUMENTS

| | | | |
|---|---|---|---|
| 2011/0227519 A1 | 9/2011 | Horng et al. | |
| 2011/0316455 A1* | 12/2011 | Maruyama | H02P 29/60 318/373 |
| 2013/0300325 A1* | 11/2013 | Aizawa | H02P 6/20 318/400.11 |
| 2015/0042258 A1* | 2/2015 | Takada | H02P 8/10 318/696 |

* cited by examiner

| ENERGIZATION SECTOR / ENERGIZING PHASE | 1 | 2 | 3 | 4 | 5 | 6 |
|---|---|---|---|---|---|---|
| UPPER SIDE | U | U | V | V | W | W |
| LOWER SIDE | V | W | W | U | U | V |

FIRST LOCKING ENERGIZATION PATTERN A

| ENERGIZING PHASE \ ENERGIZATION SECTOR | 1 | 2 | 3 | 4 | 5 | 6 |
|---|---|---|---|---|---|---|
| UPPER SIDE | U | U | V | V | W | W |
| LOWER SIDE | V | W | W | U | U | V |
| LOCKING ENERGIZATION | ● |  |  |  |  | ● |
| FORCED COMMUTATION START (ORDER) | ★ (1) | (2) | (3) | (4) | (5) | (6) |

FIG.8

SECOND LOCKING ENERGIZATION PATTERN B

| ENERGIZING PHASE \ ENERGIZATION SECTOR | 1 | 2 | 3 | 4 | 5 | 6 |
|---|---|---|---|---|---|---|
| UPPER SIDE | U | U | V | V | W | W |
| LOWER SIDE | V | W | W | U | U | V |
| LOCKING ENERGIZATION |  | ● | ● |  |  |  |
| FORCED COMMUTATION START (ORDER) | (5) | (6) | (1) ★ | (2) | (3) | (4) |

FIG.9

THIRD LOCKING
ENERGIZATION PATTERN C

| ENERGIZING PHASE \ ENERGIZATION SECTOR | 1 | 2 | 3 | 4 | 5 | 6 |
|---|---|---|---|---|---|---|
| UPPER SIDE | U | U | V | V | W | W |
| LOWER SIDE | V | W | W | U | U | V |
| LOCKING ENERGIZATION |  |  |  | ● | ● |  |
| FORCED COMMUTATION START (ORDER) | (3) | (4) | (5) | (6) | (1) ★ | (2) |

FIG.10

FOURTH LOCKING ENERGIZATION PATTERN D

| ENERGIZING PHASE \ ENERGIZATION SECTOR | 1 | 2 | 3 | 4 | 5 | 6 |
|---|---|---|---|---|---|---|
| UPPER SIDE | U | U | V | V | W | W |
| LOWER SIDE | V | W | W | U | U | V |
| LOCKING ENERGIZATION | ● | ● | | | | |
| FORCED COMMUTATION START (ORDER) | (6) | ★ (1) | (2) | (3) | (4) | (5) |

FIG.12

MOTOR DRIVE CONTROLLER AND MOTOR DRIVE CONTROL METHOD

CROSS REFERENCE TO RELATED APPLICATIONS

This application claims the benefit of Japanese Patent Application No. 2017-102496, filed May 24, 2017, which is hereby incorporated by reference in its entirety.

BACKGROUND

Technical Field

The present disclosure relates to a motor drive controller and a motor drive control method, and more particularly, to a motor drive controller and motor drive control method for positioning a rotor when a motor is started.

Background

A motor drive controller for positioning a rotor when a motor is started is known. A locking energization method, for example, is known as a method for positioning a rotor, the locking energization method locking the rotor in a predetermined position by turning on upper and lower switching elements in a predetermined phase provided in a motor drive section for a certain period of time, the motor drive section selectively energizing coils with a plurality of phases of the motor.

A motor drive controller is disclosed in Japanese Patent Application Laid-Open No. 2016-82780, the motor drive controller being capable of preventing elements of a circuit and coils of a motor from being damaged when the motor is prevented from being rotated due to interference with a foreign matter, resulting in accumulation of heat in the elements of the circuit and the coils of the motor. This controller stops the rotation of the motor for a predetermined period of time when a current value between a power source and the motor is equal to or higher than a threshold in accordance with change in a resistance value of a temperature variable resistive element having temperature characteristics in which the resistance value is changed with a temperature change.

SUMMARY

A component such as a coil generates heat when the locking energization is performed for a long period of time at the start of driving of the motor in the above-described locking energization method. The locking energization is repeated every time a restart operation is performed especially when the motor cannot be smoothly started because dust is caught, for example. Since conventionally a lock current of the locking energization flows in a coil in the same way, a large current flows in a particular coil if such a repeated locking energization is performed, and the coil repeats heat generation without being sufficiently cooled, resulting in increase in the temperature of the coil. When the temperature of the coil increases excessively, the coil may burn out or a component such as an insulator around the coil may be damaged.

If the locking energization is performed in a motor having three-phase coils with U-phase, V-phase, and W-phase, for example, a controller may control so that high-side switching elements of the U-phase and W-phase are turned on, and a low-side switching element of the V-phase is turned on. If the locking energization is always performed in such a manner, a large lock current flows in the V-phase coil, resulting in that the heat generation in the V-phase coil may become particularly large.

Japanese Patent Application Laid-Open No. 2016-82780 does not disclose an effective solution to solve a problem when such a locking energization operation is performed at the start of the motor.

The present disclosure is related to providing a motor drive controller and motor drive control method capable of a locking energization operation while preventing increase in temperature of a coil.

According to one aspect of the present disclosure, a motor drive controller includes a motor drive section selectively energizing coils with a plurality of phases of a motor, and a locking energization control section performing a locking energization operation for controlling the motor drive section so that a lock current flows in a coil when the motor is started or restarted and holding a rotor of the motor in a position corresponding to the coil in which the lock current flows, wherein in case of performing the locking energization operation, the locking energization control section switches a locking energization pattern for applying the lock current in the coil from a locking energization pattern when the preceding locking energization operation was performed and the locking energization control section controls the motor drive section so that the lock current flows in the coil in accordance with the switched locking energization pattern.

Preferably, the locking energization control section switches the locking energization pattern in accordance with a predetermined switching pattern.

Preferably, in case of performing the locking energization operation, the locking energization control section switches the locking energization pattern when a predetermined switching condition is satisfied.

Preferably, the predetermined switching condition includes whether the locking energization operation is performed a predetermined number of times n (n is an integer of 1 or more) or more in the same locking energization pattern.

Preferably, the locking energization pattern includes a combination of the coils with the plurality of phases in which the lock current flows.

Preferably, the locking energization pattern includes a combination of a phase into which the lock current flows and a phase from which the lock current flows.

Preferably, the motor has three-phase coils, and the locking energization pattern includes a combination of two phases into which the lock current flows and one phase from which the lock current flows.

Preferably, the motor has three-phase coils, and the locking energization pattern includes a combination of one phase into which the lock current flows and two phases from which the lock current flows.

Preferably, the motor drive controller further includes a forced commutation control section performing a forced commutation operation for controlling the motor drive section so that an energization pattern is switched in a predetermined order to rotate the rotor after the locking energization control section performs the locking energization operation, wherein upon performing the forced commutation operation, the forced commutation control section sets, as an initial energization pattern, an energization pattern in accordance with the locking energization pattern when the locking energization operation was performed.

Preferably, upon performing the forced commutation operation, the forced commutation control section sets, as the initial energization pattern, an energization pattern advanced in the predetermined order in accordance with the locking energization pattern when the locking energization operation was performed.

According to another aspect of the present disclosure, a method of driving a motor by controlling a motor drive section selectively energizing coils with a plurality of phases of the motor includes performing a locking energization operation for controlling the motor drive section so that a lock current flows in a coil when the motor is started or restarted and holding a rotor of the motor in a position corresponding to the coil in which the lock current flows; and driving the motor after the locking energization operation is performed. Performing the locking energization operation includes switching a locking energization pattern for applying the lock current in the coil from a locking energization pattern when the preceding locking energization operation was performed and controlling the motor drive section so that the lock current flows in the coil in accordance with the switched locking energization pattern.

According to these disclosures, a motor drive controller and motor drive control method capable of a locking energization operation while preventing increase in temperature of a coil can be provided.

BRIEF DESCRIPTION OF THE DRAWINGS

FIG. 8 is a diagram for explaining the forced commutation operation after a locking energization operation is performed in the first locking energization pattern.

FIG. 9 is a diagram for explaining the forced commutation operation after a locking energization operation is performed in the second locking energization pattern.

FIG. 10 is a diagram for explaining the forced commutation operation after a locking energization operation is performed in the third locking energization pattern.

FIG. 12 is a diagram for explaining the forced commutation operation after the locking energization operation is performed in the fourth locking energization pattern.

DETAILED DESCRIPTION

Hereinafter, a motor drive controller according to embodiments of the present disclosure will be described.

Embodiments

Figure 1:
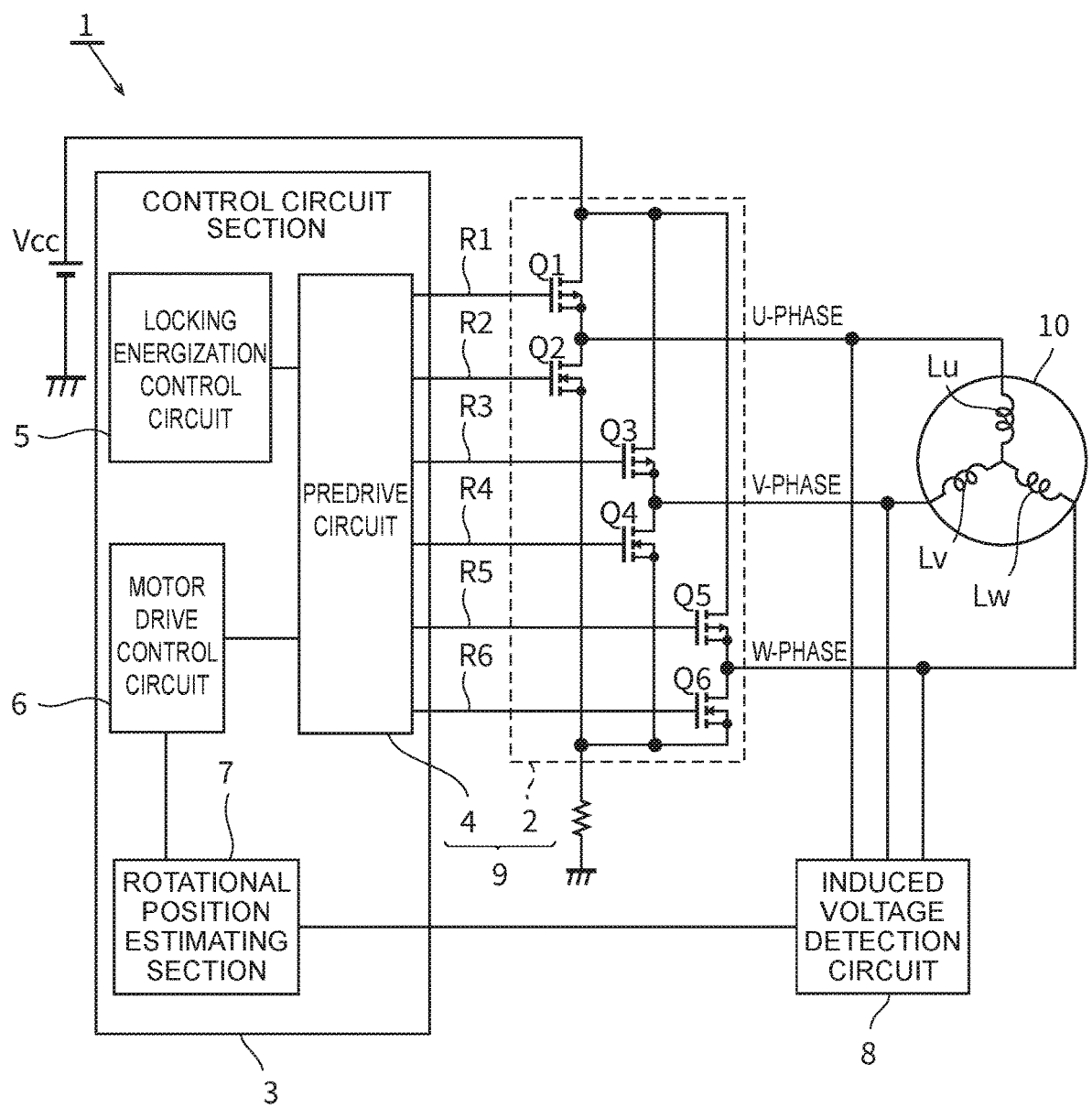
FIG. 1 is a diagram illustrating a configuration of a motor drive controller according to one of the embodiments of the present disclosure.

FIG. 1 is a diagram illustrating a configuration of a motor drive controller 1 according to one of the embodiments of the present disclosure.

As illustrated in FIG. 1, the motor drive controller 1 includes an inverter circuit 2, a control circuit section 3, and an induced voltage detection circuit 8. The motor drive controller 1 supplies driving power to a synchronous motor 10 (an example of a motor) to drive the synchronous motor 10. Note that the synchronous motor 10 according to the present embodiment is a three-phase motor having U-phase, V-phase and W-phase drive coils (an example of a coil) Lu, Lv, and Lw. The synchronous motor 10 is a sensorless synchronous motor having no sensor for detecting a position of a rotor. That is, the motor drive controller 1 is a position-sensorless motor drive controller using no sensor for detecting a position of a rotor.

The induced voltage detection circuit 8 is connected to current supply lines extending from the inverter circuit 2 to connect to each of the U-phase, V-phase, and W-phase drive coils Lu, Lv, and Lw in the synchronous motor 10, thereby to detect an induced voltage of each phase drive coil. The detected result is output to the control circuit section 3.

The inverter circuit 2 and a predrive circuit 4 in the control circuit section 3 constitute the motor drive section 9 for applying a current to each phase in the synchronous motor 10. The motor drive section 9 selectively energizes coils with a plurality of phases in the synchronous motor 10. That is, the inverter circuit 2 selectively energizes the drive coils with the respective phases in the synchronous motor 10 based on driving signals R1 to R6 output from the predrive circuit 4, thereby to control the rotation of the synchronous motor 10. The inverter circuit 2 selectively energizes each phase drive coil according to counter-electromotive voltages generated in the three-phase drive coils Lu, Lv, and Lw based on control by the control circuit section 3.

In the present embodiment, the inverter circuit 2 includes six switching elements Q1 to Q6 for supplying a driving current to each of the drive coils Lu, Lv, and Lw in the synchronous motor 10. The switching elements Q1, Q3, Q5 are high-side switching elements comprising P-channel MOSFETs (Metal-Oxide-Semiconductor Field Effect Transistors) arranged on the positive side of a DC power source Vcc. The switching elements Q2, Q4, Q6 are low-side switching elements comprising N-channel MOSFETs arranged on the negative side of the DC power source Vcc. In each of a pair of the switching elements Q1, Q2, a pair of the switching elements Q3, Q4, and a pair of the switching elements Q5, Q6, the pair of the two switching elements are connected in series. These three pairs of series circuits are connected in parallel to form a bridge circuit. A connection point of the switching elements Q1, Q2 is connected to the U-phase drive coil Lu, a connection point of the switching elements Q3, Q4 is connected to the V-phase drive coil Lv, and a connection point of the switching elements Q5, Q6 is connected to the W-phase drive coil Lw.

The control circuit section 3 includes the predrive circuit 4, a locking energization control circuit (an example of a locking energization control section) 5, a motor drive control circuit (an example of a forced commutation control section) 6, and a rotational position estimating section 7. The control circuit section 3 can be formed by using a programmable device such as a DSP (Digital Signal Processor), an FPGA (Field Programmable Gate Array) and a microcomputer, for example.

The predrive circuit 4 includes a plurality of output terminals to be connected to gate terminals of the six switching elements Q1 to Q6 in the inverter circuit 2, respectively. The predrive circuit 4 outputs the driving signals R1 to R6 from the output terminals, respectively, thereby to control turning on/off operations of the switching elements Q1 to Q6. At the time of sensorless drive, the predrive circuit 4 outputs the driving signals R1 to R6 according to the counter-electromotive voltages generated in the drive coils Lu, Lv, and Lw with the respective phases based on control of the motor drive control circuit 6. That is, the inverter circuit 2 selectively energizes each drive coil based on the counter-electromotive voltages generated in the drive coils Lu, Lv, and Lw with the respective phases in the synchronous motor 10.

The rotational position estimating section 7 estimates a rotational position of the rotor of the synchronous motor 10 based on the detected result of the induced voltage detection circuit 8. The motor drive control circuit 6 controls an operation of the predrive circuit 4 according to the rotational position of the rotor estimated by the rotational position estimating section 7. The motor drive control circuit 6 controls operations from a forced commutation to the sensorless drive after the locking energization.

The locking energization control circuit 5 controls an operation of the locking energization for locking the rotor in a predetermined position at the start time of the synchronous motor 10. The locking energization control circuit 5 performs the locking energization operation for controlling the motor drive section 9 so that the lock current flows in the drive coils Lu, Lv, and Lw when the synchronous motor 10 is started or restarted. Then, the locking energization control circuit 5 holds the rotor of the synchronous motor 10 in a position corresponding to drive coils Lu, Lv, and Lw in which the lock current flows. In the present embodiment, the locking energization control circuit 5 controls the motor drive section 9 so that the lock current for holding the rotor in a predetermined locking position flows in the drive coils Lu, Lv, and Lw from the motor drive section 9 in a locking energization period before the rotation start of the synchronous motor 10.

Hereinafter, a basic operation of the motor drive controller 1 will be simply described.

Figure 2:
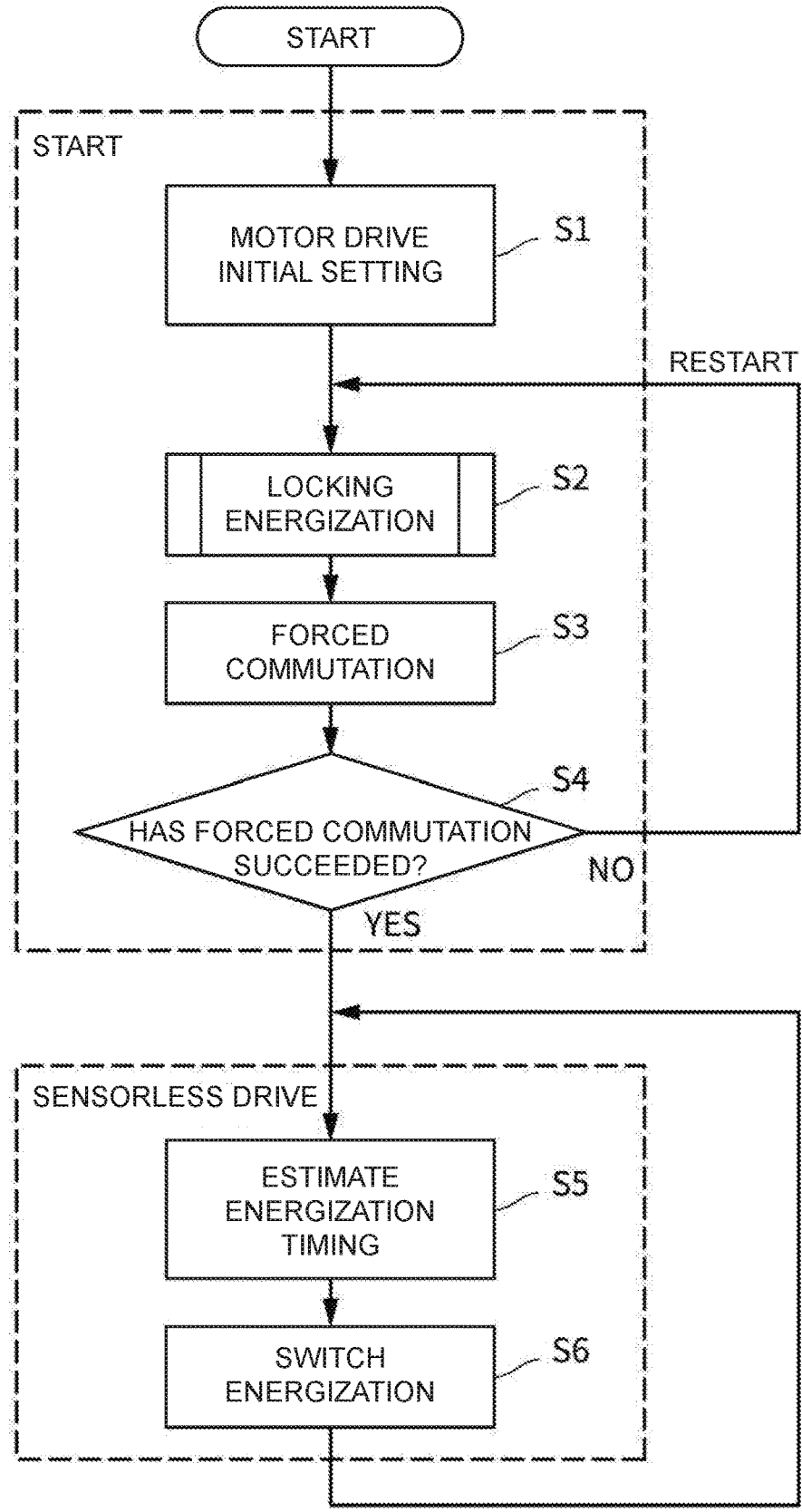
FIG. 2 is a flowchart illustrating a basic operation of the motor drive controller.

FIG. 2 is a flowchart illustrating the basic operation of the motor drive controller 1.

As illustrated in FIG. 2, the motor drive controller 1 roughly performs two operations of starting steps (step S1 to Step S4) and sensorless driving steps (step S5 to step S6).

The motor drive controller 1 sets various specifications (a port, a timer, and the like) of the control circuit section 3 formed of a microcomputer or the like to adapt a driving condition of the synchronous motor 10 to start the synchronous motor 10 in the motor drive initial setting step (step S1).

The process proceeds to a locking energization step. The locking energization control circuit 5 performs the locking energization operation and outputs a locking energization control signal to the predrive circuit 4. The predrive circuit 4 performs turning on/off operations of the switching elements Q1 to Q6 in the inverter circuit 2 according to the locking energization control signal. Then, the lock current flows in the drive coils Lu, Lv, and Lw with the respective phases (U-phase, V-phase, W-phase) in the synchronous motor 10, thereby to lock the rotor of the synchronous motor 10 in a predetermined position (step S2). The operation of the locking energization step will be described later in detail.

The process proceeds to a forced commutation step. The motor drive control circuit 6 performs the forced commutation operation for controlling the motor drive section 9 so that an energization pattern is switched in a predetermined order after the locking energization control circuit 5 performs the locking energization operation, thereby to rotate the rotor. A driving control signal is output to the predrive circuit 4 from the motor drive control circuit 6, for example. The predrive circuit 4 performs turning on/off operations of the switching elements Q1 to Q6 in the inverter circuit 2 according to the driving control signal. Then, the driving current sequentially flows in the drive coils Lu, Lv, and Lw with the respective phases (U-phase, V-phase, W-phase) in the synchronous motor 10, so that a rotational speed of the rotor is gradually increased (step S3).

Figure 3:
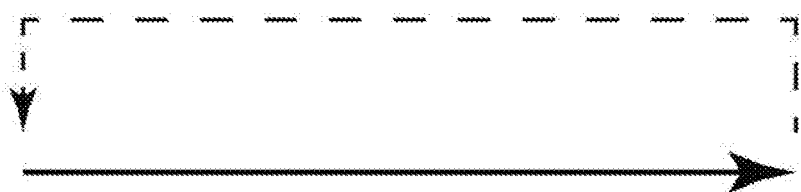
FIG. 3 is a diagram illustrating a transition of an energization pattern in a forced commutation step.

FIG. 3 is a diagram illustrating a transition of an energization pattern in the forced commutation step.

As illustrated in FIG. 3, in the present embodiment, there are six energization patterns (energization sectors 1 to 6) comprising a combination of an upper-side phase into which a current flows and a lower-side phase from which the current flows for the U-phase, V-phase, and W-phase drive coils Lu, Lv, and Lw. In the energization sector 1, the current flows from the U-phase (upper side) to the V-phase (lower side). In the energization sector 2, the current flows from the U-phase to the W-phase. In the energization sector 3, the current flows from the V-phase to the W-phase. In the energization sector 4, the current flows from the V-phase to the U-phase. In the energization sector 5, the current flows from the W-phase to the U-phase. In the energization sector 6, the current flows from the W-phase to the V-phase. In the forced commutation step, the energization pattern is switched in a predetermined order i.e., in the cyclic order of the energization sector 1, the energization sector 2, the energization sector 3, the energization sector 4, the energization sector 5, the energization sector 6, and the energization sector 1 when the rotor is rotated in a predetermined direction. When the energization pattern is sequentially and repeatedly switched in the predetermined order from the energization sectors 1 to 6 while gradually shortening the energizing time of each energization pattern, the rotational speed of the rotor is gradually increased.

Returning to FIG. 2, the motor drive control circuit 6 determines whether the forced commutation operation has succeeded (step S4). For example, the motor drive control circuit 6 determines whether the rotational speed of the rotor reaches a predetermined rotational speed when a predetermined time has elapsed since the start of the forced commutation operation. If the rotational speed of the rotor reaches the predetermined rotational speed, the motor drive control circuit 6 determines that the forced commutation operation has succeeded. If the rotation speed of the rotor does not reach the predetermined rotational speed, the motor drive control circuit 6 determines that the forced commutation operation has not succeeded. If the motor drive control circuit 6 determines that the forced commutation operation has not succeeded (NO in step S4), a restart operation is performed. In the restart operation, the processes are performed from step S2 again.

When the motor drive control circuit 6 determines that the forced commutation operation has succeeded (YES in step S4), that is, when the motor drive control circuit 6 determines that the rotational speed of the rotor reaches the predetermined rotational speed, the process proceeds to the sensorless driving steps. In the sensorless driving steps, the motor drive controller 1 starts a steady sensorless drive in an energization timing estimating step. The rotational position estimating section 7 of the control circuit section 3 detects a zero-cross point based on a change in induced voltage of each phase, and estimates the energization timing (step S5).

The process proceeds to an energization switching step. The motor drive control circuit 6 switches the energization to each phase at the energization timing estimated by the rotational position estimating section 7, thereby to continue a constant speed rotation of the synchronous motor 10 (step S6).

As described above, the motor drive controller 1 according to the present embodiment performs a steady rotational operation through the operation steps in FIG. 2. That is, a motor drive control method according to the present embodiment includes a locking energization control step (step S2) of holding the rotor of the synchronous motor 10 in a position corresponding to drive coils Lu, Lv, and Lw in which the lock current flows, by performing the locking energization operation for controlling the motor drive section 9 so that the lock current flows in the drive coils Lu, Lv, and Lw when the motor is started or restarted, and a driving step (step S3 to step S6) of driving the motor after the locking energization operation is performed.

A specific operation method of the locking energization step will be described. As described below, in the motor drive control method according to the present embodiment, the locking energization control step (step S2) includes switching a locking energization pattern for applying the lock current in the drive coils Lu, Lv, and Lw from a locking energization pattern when a preceding locking energization operation was performed, to perform the locking energization operation, and controlling so that the lock current flows in the drive coil Lu, Lv, and Lw in accordance with the switched locking energization pattern.

The locking energization control circuit 5 switches a locking energization pattern for applying the lock current in the drive coils Lu, Lv, and Lw from a locking energization pattern when a preceding locking energization operation was performed, to perform the locking energization operation. Then, the locking energization control circuit 5 controls so that the lock current flows in the drive coils Lu, Lv, and Lw in accordance with the switched locking energization pattern. In other words, the locking energization control circuit 5 selects a locking energization pattern different from the locking energization pattern when the preceding locking energization operation was performed, as a locking energization pattern for applying the lock current in the drive coils Lu, Lv, and Lw, to perform the locking energization operation. Then, the locking energization control circuit 5 controls so that the lock current flows in the drive coils Lu, Lv, and Lw in accordance with the selected locking energization pattern.

In the present embodiment, the locking energization control circuit 5 switches the locking energization pattern in accordance with a predetermined switching pattern. The locking energization control circuit 5 switches the locking energization pattern when a predetermined switching condition is satisfied, to perform the locking energization operation. Note that the predetermined switching condition includes whether the locking energization operation is performed a predetermined number of times n (n is an integer of 1 or more) or more in the same locking energization pattern, and the locking energization pattern is switched when the locking energization operation is performed the predetermined number times n or more in the same locking energization pattern. Specifically, the predetermined switching condition includes whether the locking energization operation is performed once or more in the same locking energization pattern. That is, in the present embodiment, the locking energization pattern is switched from the locking energization pattern when the preceding locking energization operation was performed to another locking energization pattern in accordance with the predetermined switching pattern every time the locking energization operation is performed.

Note that the predetermined switching condition is not limited to the present embodiment (another example will be described later).

Three examples are prepared for the locking energization pattern. That is, the locking energization operation is performed in accordance with any one of a first locking energization pattern A, a second locking energization pattern B, and a third locking energization pattern C (hereinafter sometimes collectively referred to as locking energization patterns A, B, and C). The locking energization pattern is switched in the cyclic order of the first locking energization pattern A, the second locking energization pattern B, the third locking energization pattern C, and the first locking energization pattern A (an example of the predetermined switching pattern) every time the locking energization operation is performed.

Each of the locking energization patterns A, B, and C includes a combination of phases in which the lock current flows among the three-phase drive coils Lu, Lv, and Lw. Each of the locking energization patterns A, B, and C includes a combination of a phase into which the lock current flows and a phase from which the lock current flows. That is, each of the locking energization patterns A, B, and C includes an energizing direction. More specifically, the locking energization pattern includes a combination of two phases into which the lock current flows. That is, in the present embodiment, the locking energization is performed so that the lock current flows into two phases among the drive coils Lu, Lv, and Lw and flows from the rest phase. The locking energization patterns A, B, and C define one of the pair of switching elements Q1, Q2, one of the pair of switching elements Q3, Q4, and one of the pair of switching elements Q5, Q6 corresponding to the respective phases are to be turned on, and the other of the pair of switching elements Q1, Q2, the other of the pair of switching elements Q3, Q4, and the other of the pair of switching elements Q5, Q6 are to be turned off, so that the lock current flows into two phases among three phases, and flows from the rest phase.

Figure 4:
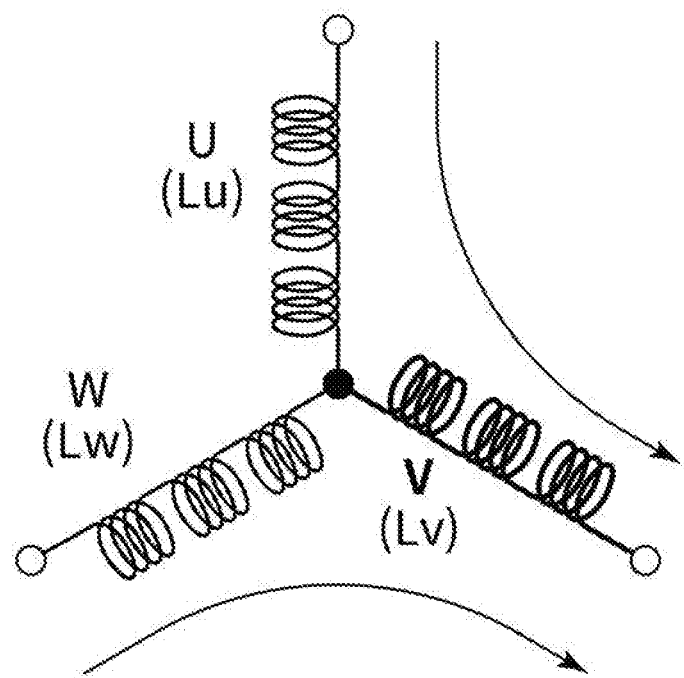
FIG. 4 is a diagram for explaining a first locking energization pattern.

FIG. 4 is a diagram for explaining the first locking energization pattern A.

In FIG. 4, each of the arrows indicates a direction of a lock current flow. In the first locking energization pattern A, the lock current flows into the U-phase and the W-phase and flows from the V-phase. That is, the upper side of the U-phase (switching element Q1) is turned on, the lower side of the U-phase (switching element Q2) is turned off, the upper side of the V-phase (switching element Q3) is turned off, the lower side of the V-phase (switching element Q4) is turned on, the upper side of the W-phase (switching element Q5) is turned on, and the lower side of the W-phase (switching element Q6) is turned off. In the first locking energization pattern A, a large current flows in the V-phase drive coil Lv, and the V-phase drive coil Lv generates heat relatively easily.

Figure 5:
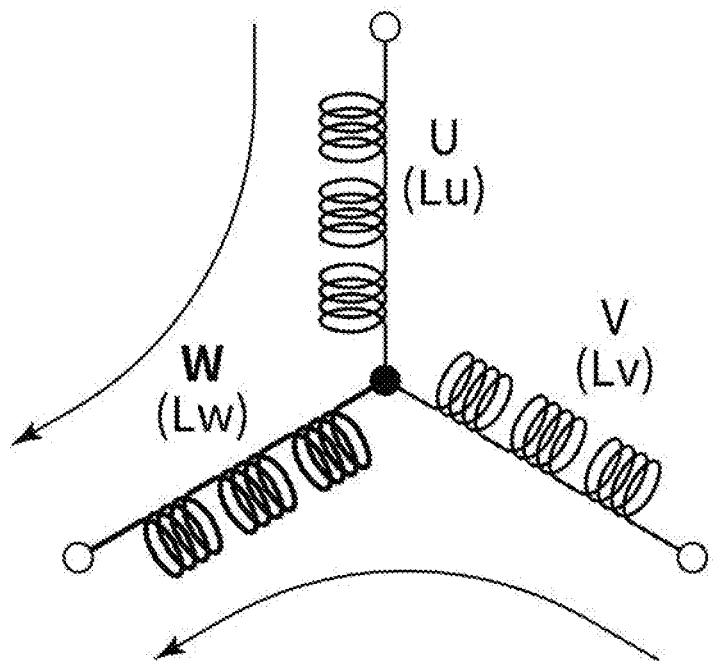
FIG. 5 is a diagram for explaining a second locking energization pattern.

FIG. 5 is a diagram for explaining the second locking energization pattern B.

In FIG. 5, each of the arrows indicates a direction of a lock current flow. In the second locking energization pattern B, the lock current flows into the U-phase and the V-phase and flows from the W-phase. That is, the upper side of the U-phase is turned on, the lower side of the U-phase is turned off, the upper side of the V-phase is turned on, the lower side of the V-phase is turned off, the upper side of the W-phase is turned off, and the lower side of the W-phase is turned on. In the second locking energization pattern B, a large current flows in the W-phase drive coil Lw, and the W-phase drive coil Lw generates heat relatively easily.

Figure 6:
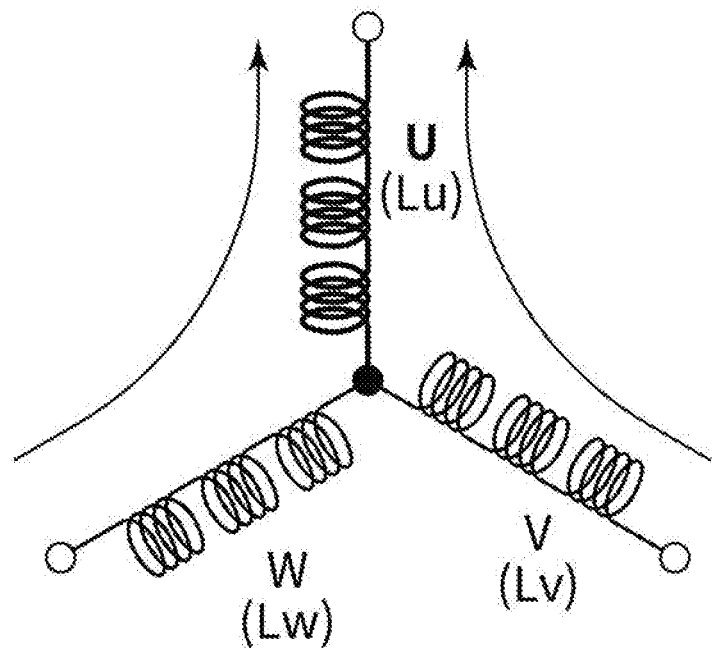
FIG. 6 is a diagram for explaining a third locking energization pattern.

FIG. 6 is a diagram for explaining the third locking energization pattern C.

In FIG. 6, each of the arrows indicates a direction of a lock current flow. In the third locking energization pattern C, the lock current flows into the V-phase and the W-phase and flows from the U-phase. That is, the upper side of the U-phase is turned off, the lower side of the U-phase is turned on, the upper side of the V-phase is turned on, the lower side of the V-phase is turned off, the upper side of the W-phase is turned on, and the lower side of the W-phase is turned off. In the third locking energization pattern C, a large current flows in the U-phase drive coil Lu, and the U-phase drive coil Lu generates heat relatively easily.

Figure 7:
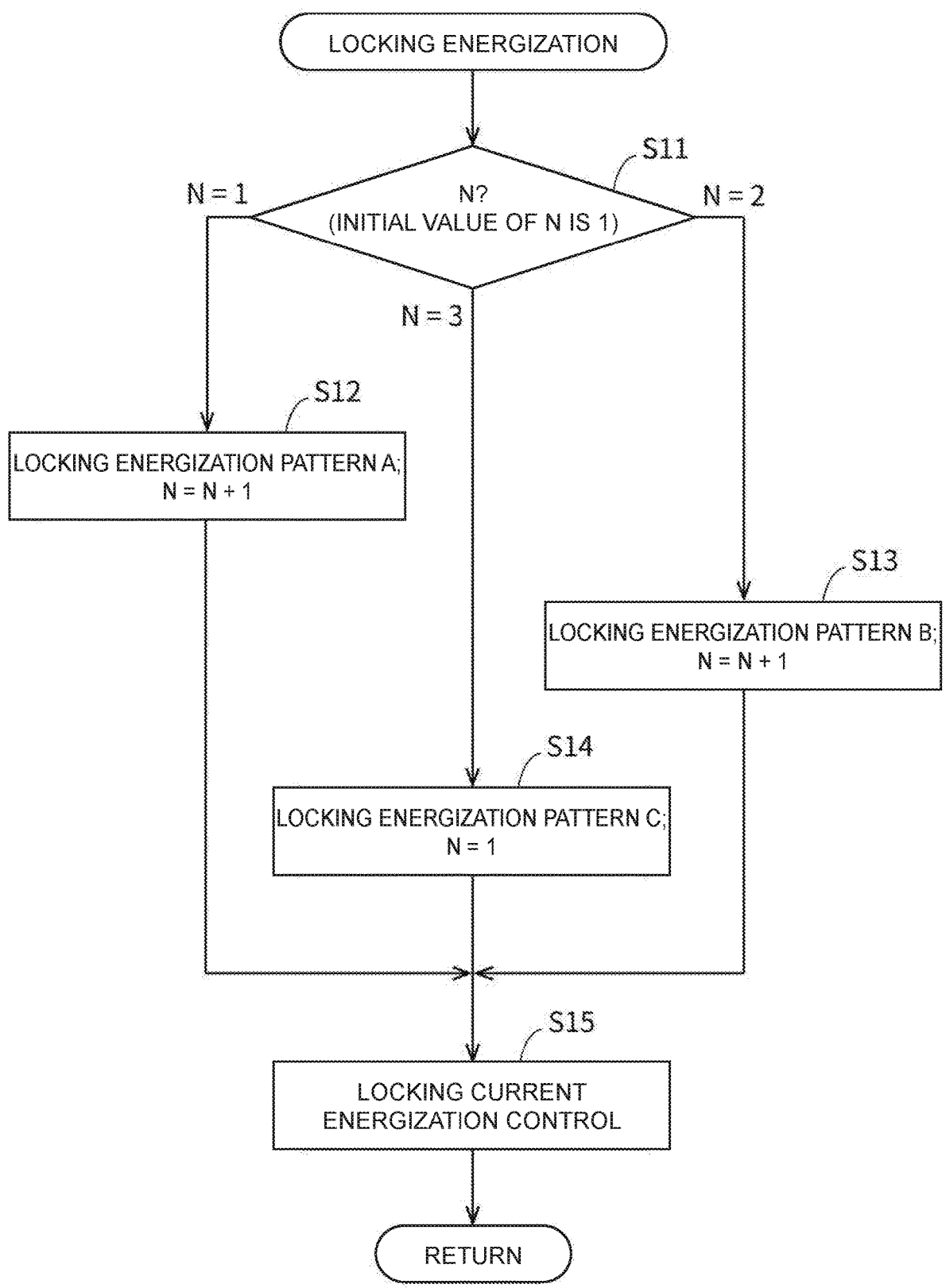
FIG. 7 is a flowchart illustrating an example of control of a locking energization step.

FIG. 7 is a flowchart illustrating an example of control of the locking energization step.

As illustrated in FIG. 7, in the locking energization step, the locking energization pattern is switched as follows, to perform the locking energization operation. That is, in step S11, the locking energization control circuit 5 determines what a variable N is. Here, the variable N is an integer of 1 or more. An initial value of the variable N is 1, for example.

If the variable N is 1, the process of step S12 is performed. The locking energization control circuit 5 switches the locking energization pattern to the first locking energization pattern A. The locking energization control circuit 5 adds "1" to the variable N. Then, the variable N becomes 2.

If the variable N is 2, the process of step S13 is performed. The locking energization control circuit 5 switches the locking energization pattern to the second locking energization pattern B. The locking energization control circuit 5 adds "1" to the variable N. Then, the variable N becomes 3.

If the variable N is 3, the process of step S14 is performed. The locking energization control circuit 5 switches the locking energization pattern to the third locking energization pattern C. The locking energization control circuit 5 substitutes "1" in the variable N. Then, the variable N becomes 1.

When any one of the processes from step S12 to step S14 is performed, the process proceeds to step S15. That is, the locking energization control circuit 5 controls the motor drive section 9 so that the lock current is applied in the switched locking energization pattern. Then, the locking energization step is completed.

Thus, in the present embodiment, the locking energization pattern is switched every time the locking energization operation is performed, and the lock current flows in the locking energization pattern different from the locking energization pattern when the preceding locking energization operation was performed. That is, the drive coil Lu, Lv or Lw in which a relatively large current flows is changed every time the locking energization operation is performed. Thus, the temperature of the drive coil Lu, Lv or Lw hardly increases as compared with a case where the same locking energization pattern is always used to perform the locking energization operation and the large current repeatedly flows in any one of drive coils. Therefore, the locking energization operation can be performed while suppressing heat generation in the drive coil.

In the present embodiment, since the locking energization pattern is switched as described above, the energization pattern is switched to an energization pattern to start the energization in the forced commutation step in accordance with the switched locking energization pattern (the initial energization pattern is switched). That is, the motor drive control circuit 6 sets, as the initial energization pattern, the energization pattern according to the locking energization pattern when the locking energization operation was performed, when performing the forced commutation operation. Specifically, the motor drive control circuit 6 sets, as the initial energization pattern, the energization pattern advanced in the predetermined order in accordance with the locking energization pattern when the locking energization operation was performed, when performing the forced commutation operation.

In the present embodiment, the locking energization is performed in any one of the three locking energization patterns A, B, and C as described above. It can be said that a state where the locking energization is performed in each of the locking energization patterns is a state where a current flows in two successive energization sectors in the above-described predetermined order of the energization sectors 1 to 6. In each of the locking energization patterns, the energization pattern advanced in the above-described predetermined order of such two energization sectors is an energization pattern at the start of the forced commutation operation.

FIG. 8 is a diagram for explaining the forced commutation operation after the locking energization operation is performed in the first locking energization pattern A.

As illustrated in FIG. 8, when the locking energization operation is performed in the first locking energization pattern A, the lock current flows from the U-phase drive coil Lu and the W-phase drive coil Lw to the V-phase drive coil Lv. That is, as indicated by black round marks in FIG. 8, the current flows in the energization sector 6 and the energization sector 1.

Thus, the forced commutation operation is started in the energization pattern of the energization sector 1 because the energization sector 1 is in advance of the energization sector 6 in the predetermined order when the forced commutation operation is performed after the locking energization operation is performed. That is, the energization sector 1 indicated by a star mark in FIG. 8 is set as a start energization pattern, and the forced commutation operation is performed while switching the energization pattern in the cyclic order of (1) energization sector 1, (2) energization sector 2, (3) energization sector 3, (4) energization sector 4, (5) energization sector 5, (6) energization sector 6, and (7) energization sector 1.

FIG. 9 is a diagram for explaining the forced commutation operation after the locking energization operation is performed in the second locking energization pattern B.

As illustrated in FIG. 9, when the locking energization operation is performed in the second locking energization pattern B, the lock current flows from the U-phase drive coil Lu and the V-phase drive coil Lv to the W-phase drive coil Lw. That is, as indicated by black round marks in FIG. 9, the current flows in the energization sector 2 and the energization sector 3.

Thus, the forced commutation operation is started in the energization pattern of the energization sector 3 because the energization sector 3 is in advance of the energization sector 2 when the forced commutation operation is performed after the locking energization operation is performed. That is, the energization sector 3 indicated by a star mark in FIG. 9 is set as a start energization pattern, and the forced commutation operation is performed while switching the energization pattern in the cyclic order of (1) energization sector 3, (2) energization sector 4, (3) energization sector 5, (4) energization sector 6, (5) energization sector 1, (6) energization sector 2, and (7) energization sector 3.

FIG. 10 is a diagram for explaining the forced commutation operation after the locking energization operation is performed in the third locking energization pattern C.

As illustrated in FIG. 10, when the locking energization operation is performed in the third locking energization pattern C, the lock current flows from the V-phase drive coil Lv and the W-phase drive coil Lw to the U-phase drive coil Lu. That is, as indicated by black round marks in FIG. 10, the current flows in the energization sector 4 and the energization sector 5.

Thus, the forced commutation operation is started in the energization pattern of the energization sector 5 because the energization sector 5 is in advance of the energization sector 4 when the forced commutation operation is performed after the locking energization operation is performed. That is, the energization sector 5 indicated by a star mark in FIG. 10 is set as a start energization pattern, and the forced commutation operation is performed while switching the energization pattern in the cyclic order of (1) energization sector 5, (2) energization sector 6, (3) energization sector 1, (4) energization sector 2, (5) energization sector 3, (6) energization sector 4, and (7) energization sector 5.

Thus, the forced commutation operation is started from the energization pattern according to the locking energization pattern, thereby being capable of efficiently and smoothly rotating, by the forced commutation, the rotor held in a position corresponding to the drive coils in which the current flows by the locking energization.

As described above, in the present embodiment, the locking energization pattern is switched even if the locking energization operation is performed highly frequently, thereby being capable of preventing a particular drive coil from being overheated without repeating heat generation in the particular drive coil. Therefore, the drive coils and the components around the drive coils can be prevented from being damaged due to heat. It is not necessary to stop the operation of the synchronous motor 10 to prevent overheating.

Explanation of Modification

The locking energization pattern is not limited to the above-described locking energization pattern. The locking energization pattern may include a combination of one phase into which the lock current flows and two phases from which the lock current flows. That is, the locking energization may be performed so that the lock current flows into any one phase among three-phase drive coils Lu, Lv, and Lw and flows from the other two phases.

Figure 11:
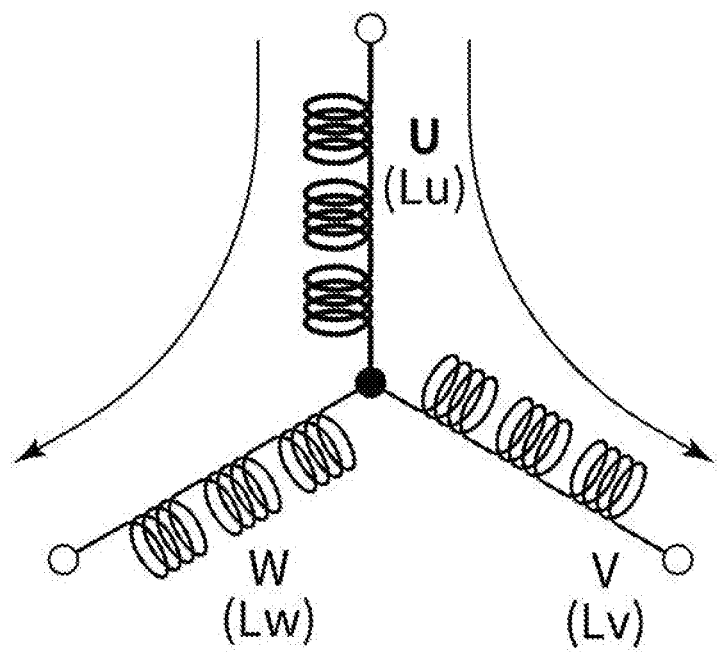
FIG. 11 is a diagram for explaining a fourth locking energization pattern according to a modification of the present embodiment.

FIG. 11 is a diagram for explaining a fourth locking energization pattern according to a modification of the present embodiment.

In FIG. 11, each of the arrows indicates a direction of a lock current flow. FIG. 11 illustrates an example of the locking energization pattern (fourth locking energization pattern D) in which the lock current flows into one phase and flows from the other two phases. That is, in the fourth locking energization pattern D, the lock current flows into the U-phase, and flows from the V-phase and the W-phase. That is, the upper side of the U-phase is turned on, the lower side of the U-phase is turned off, the upper side of the V-phase is turned off, the lower side of the V-phase is turned on, the upper side of the W-phase is turned off, and the lower side of the W-phase is turned on.

In the fourth locking energization pattern D, a large current flows in the U-phase drive coil Lu, and the U-phase drive coil Lu generates heat relatively easily. In addition, a fifth locking energization pattern E and a sixth locking energization pattern F are also prepared, for example. In the fifth locking energization pattern E, the lock current flows into the V-phase drive coil Lv, and in the sixth locking energization pattern F, the lock current flows into the W-phase drive coil Lw. The locking energization operation is performed while switching among the locking energization patterns D, E, and F according to the predetermined switching condition, thereby being capable of preventing only a particular drive coil from generating heat.

Note that when the forced commutation operation is started after the locking energization operation is thus performed in the locking energization pattern in which the lock current flows into one phase, the energization pattern advanced in the predetermined order according to the locking energization pattern when the locking energization operation was performed may be set as the initial energization pattern.

FIG. 12 is a diagram for explaining the forced commutation operation after the locking energization operation is performed in the fourth locking energization pattern D.

As illustrated in FIG. 12, when the locking energization operation is performed in the fourth locking energization pattern D, the lock current flows from the U-phase drive coil Lu to the W-phase drive coil Lw and the V-phase drive coil Lv. That is, as indicated by black round marks in FIG. 12, the current flows in the energization sector 1 and the energization sector 2.

Thus, the forced commutation operation is started in the energization pattern of the energization sector 2 because the energization sector 2 is in advance of the energization sector 1 when the forced commutation operation is performed after the locking energization operation is performed. That is, the energization sector 2 indicated by a star mark in FIG. 12 is set as a start energization pattern, and the forced commutation operation is performed while switching the energization pattern in the cyclic order of (1) energization sector 2, (2) energization sector 3, (3) energization sector 4, (4) energization sector 5, (5) energization sector 6, (6) energization sector 1, and (7) energization sector 2.

Thus, the forced commutation operation is started from the energization pattern according to the locking energization pattern, thereby being capable of efficiently and smoothly rotating the rotor similarly as described above.

Others

The motor drive controller is not limited to circuit configurations as indicated in the above-described embodiments and the modification of the embodiment. Various circuit configurations formed to achieve the objective of the present disclosure can be applied to the motor drive controller.

Various conditions can be used as the predetermined switching condition of switching the locking energization pattern.

The predetermined switching condition may include a condition whether the locking energization operation is continuously performed a predetermined number of times n (n is an integer of 1 or more) in the same locking energization pattern, for example. In this case, when n is 1, the locking energization pattern is switched every time the locking energization is performed similarly as in the above-described embodiment. When n is 2 or more, the locking energization operation is continuously performed n times in one locking energization pattern, and then the next locking energization operation is performed in a locking energization pattern different from the preceding locking energization pattern.

The predetermined switching condition may include a condition that the locking energization operation is continuously performed R times (R is an integer determined at random of a predetermined number or less or an integer variable in a predetermined method) in the same locking energization pattern, for example. The motor drive controller may have a clocking function so that the predetermined switching condition may include a condition whether the locking energization operation is performed for a predetermined period of time in the same locking energization pattern (the locking energization pattern is switched when the locking energization operation is performed for the predetermined period of time in the same locking energization pattern), and a condition whether a predetermined time arrives (the locking energization pattern is switched when the predetermined time arrives). Furthermore, the switching condition may include a condition whether a temperature of the motor (for example, a temperature of the drive coil or a component around the drive coil) exceeds a predetermined temperature by monitoring the temperature of the motor (the locking energization pattern is switched when the temperature exceeds the predetermined temperature).

The locking energization pattern may be switched at the arbitrary timing such as when a predetermined instruction is input to the control circuit section or the like from external equipment, or in irregular timing, for example.

The switching pattern of the locking energization pattern is not limited to the above-described switching pattern. For example, in the above-described embodiment, the locking energization pattern may be switched in the order of the first locking energization pattern A, the third locking energization pattern C, and the second locking energization pattern B every time the locking energization operation is performed.

The locking energization pattern may be switched to a locking energization pattern selected at random by the locking energization control circuit 5 or a locking energization pattern appropriately selected in a predetermined method. That is, the locking energization pattern may be switched to a locking energization pattern different from the locking energization pattern when the preceding locking energization operation was performed. Among the prepared three or more locking energization patterns, the locking energization pattern is not switched to a particular locking energization pattern, and the locking energization pattern used among the other two or more locking energization patterns may be switched. For example, the locking energization pattern may be switched based on a predetermined switching pattern previously set by combining patterns from the above-described first locking energization pattern A to sixth locking energization pattern F.

The locking energization pattern is switched as described above, thereby being capable of preventing the lock current from always flowing in a specific drive coil. Therefore, the effects similar to the above-described embodiment can be obtained.

The forced commutation operation may not be started from the above-described energization pattern according to the locking energization pattern. For example, the forced commutation may always be started in the same energization pattern.

All of the drive coils with a plurality of phases may not be used in the locking energization pattern, and the locking energization pattern including a drive coil in which the current does not flow may be used.

In the above-described embodiment, the switching elements forming the inverter circuit 2 are MOSFETs, but are not limited to MOSFETs, and may be bipolar transistors, or the like, for example.

The motor driven by the motor drive controller in the present embodiment is not limited to a three-phase brushless motor. The motor may be provided with drive coils with three or more phases. The type of the motor is not limited to a brushless motor.

A system of detecting a position of the rotor is not limited to the sensorless system in the present embodiment. For example, a system of detecting the rotational speed of the motor using an FG sensor, or the like, and a system having a sensor for detecting the position of the rotor may be controlled to be driven by the motor drive controller of the present embodiment.

Each of the above-described flowcharts is an example for explaining the operation, and is not limited to this example. The steps illustrated in the flowcharts are specific examples, and are not limited to the flowcharts illustrated in the drawings. For example, the order of each step may be changed, another process may be inserted between steps, and the processes may be performed in parallel.

A part or all of the processes in the above-described embodiment may be performed by software or using a hardware circuit. For example, the control circuit section is not limited to a microcomputer. At least a part of internal components of the control circuit section may be processed by software.

It is to be understood that the above-described embodiments are exemplary in all aspects, but are not limitative. The scope of the present disclosure is defined by the appended claims rather than the forgoing description of embodiments, and all modifications are intended to be included within the scope of the claims and within the equivalent meaning and scope.

What is claimed is:

1. A motor drive controller comprising:
   a motor drive section selectively energizing three-phase coils of a motor having first, second and third coils;
   a locking energization control section performing a locking energization operation, in accordance with one of a plurality of locking energization patterns including first and second locking energization patterns, for controlling the motor drive section so that a lock current flows in all of the three-phase coils at the same time when the motor is started or restarted and stopping and holding a rotor of the motor in a position corresponding to the coils in which the lock current is flowing; and
   a forced commutation control section performing a forced commutation operation for controlling the motor drive section by sequentially switching among a plurality of energization patterns in a predetermined order to rotate the rotor after the locking energization control section performs the locking energization operation,
   wherein:
   before the forced commutation operation, the locking energization control section performs the locking energization operation in accordance with the first locking energization pattern to stop the rotor in said position when the motor is started,
   after the locking energization control section energizes the coils with the first locking energization pattern to stop the rotor in said position, the locking energization control section causes the forced commutation control section to perform the forced commutation operation, and when the forced commutation operation doesn't succeed with the first locking energization pattern, the locking energization control section performs the locking energization operation by energizing the coils in accordance with the second locking energization pattern different from the first locking energization pattern, and causes the forced commutation control section to perform the forced commutation operation to restart rotation of the rotor, wherein in the first locking energization pattern for stopping and holding the rotor in said position, the current flowing in the first coil is larger than those of the second and third coils, and in the second locking energization pattern for stopping and holding the rotor in said position, the current flowing in the second coil is larger than those of the third and first coils.

2. The motor drive controller according to claim 1, wherein the locking energization control section switches among the plurality of locking energization patterns in accordance with a predetermined switching pattern.

3. The motor drive controller according to claim 1, wherein in case of performing the locking energization operation, the locking energization control section switches among the plurality of locking energization patterns when a predetermined switching condition is satisfied.

4. The motor drive controller according to claim 3, wherein the predetermined switching condition includes whether the locking energization operation is performed a predetermined number of times n (n is an integer of 1 or more) or more in the same locking energization pattern.

5. The motor drive controller according to claim 1, wherein the locking energization pattern used by the locking energization control section includes a combination of the coils with the plurality of phases in which the lock current flows.

6. The motor drive controller according to claim 5, wherein the locking energization pattern used by the locking energization control section includes a combination of a phase into which the lock current flows and a phase from which the lock current flows.

7. The motor drive controller according to claim 1, wherein the locking energization pattern used by the locking energization control section includes a combination of two phases into which the lock current flows and one phase from which the lock current flows.

8. The motor drive controller according to claim 1, wherein the locking energization pattern used by the locking energization control section includes a combination of one phase into which the lock current flows and two phases from which the lock current flows.

9. The motor drive controller according to claim 1, wherein upon performing the forced commutation operation, the forced commutation control section sets, as an initial energization pattern, an energization pattern in accordance with the locking energization pattern used by the locking energization control section when the locking energization operation was performed.

10. The motor drive controller according to claim 9, wherein upon performing the forced commutation operation, the forced commutation control section sets, as an initial energization pattern, an energization pattern advanced in the predetermined order in accordance with the locking energization pattern used by the locking energization control section when the locking energization operation was performed.

11. The motor drive controller according to claim 1, wherein the motor drive controller performs the locking energization operation in a position-sensorless manner.

12. A method of driving a motor by controlling a motor drive section selectively energizing three-phase coils with a plurality of phases of the motor having first, second and third coils, the method comprising:

performing a locking energization operation in accordance with a first locking energization pattern for controlling the motor drive section by energizing the coils with the first locking energization pattern so that a lock current flows in all of the three-phase coils at the same time when the motor is started or restarted and stopping and holding a rotor of the motor in a position corresponding to the coil in which the lock current is flowing; and driving the motor by performing a forced commutation operation for controlling the motor drive section by switching among a plurality of energization patterns in a predetermined order, after the locking energization operation is performed, wherein before the forced commutation operation, the locking energization control section performs the locking energization operation in accordance with the first locking energization pattern to stop the rotor in said position when the motor is started, after the locking energization control section energizes the coils with the first locking energization pattern to stop the rotor in said position, the locking energization control section causes the forced commutation control section to perform the forced commutation operation, when the forced commutation operation doesn't succeed with the first locking energization pattern, performing a second locking energization operation by energizing the coils in accordance with a second locking energization pattern different form the first locking energization pattern, and causing the forced commutation control section to perform the forced commutation operation to restart rotation of the rotor, wherein in the first locking energization pattern for stopping and holding the rotor in said position the current flowing in the first coil is larger than those of the second and third coils, and in the second locking energization pattern for stopping and holding the rotor in said position the current flowing in the second coil is larger than those of the third and first coils.

13. The method according to claim 12, wherein the locking energization operation is performed in a position-sensorless manner.

* * * * *